March 13, 1934.                B. KNOPP                 1,950,409
                    COMBINED EGG CANDLER AND DATER
                         Filed Aug. 22, 1932

Inventor
Bernard Knopp

By Emil F. Lange
                Attorney

Patented Mar. 13, 1934

1,950,409

UNITED STATES PATENT OFFICE 1,950,409

COMBINED EGG CANDLER AND DATER

Bernard Knopp, Bennett, Nebr.

Application August 22, 1932, Serial No. 629,921

2 Claims. (Cl. 99—6)

My invention relates to egg candlers, its primary object being the provision of an egg candler having means for stamping the date of candling on the egg while the egg is being candled.

One of my objects is the provision of a combined egg candler and dater wherein the egg will be dated while it is being candled and without extra manipulation of the dater.

Another of my objects is the provision of a combined candler and dater whereby the egg may be candled and then dated if the egg proves to be clear.

It is also my object to provide a combined candler and dater for eggs, the mechanism being of extreme simplicity.

Having in view these objects and others which will be pointed out in the following description, I will now refer to the drawing, in which Figure 1 is a sectional view of the combined candler and dater.

Figure 1:
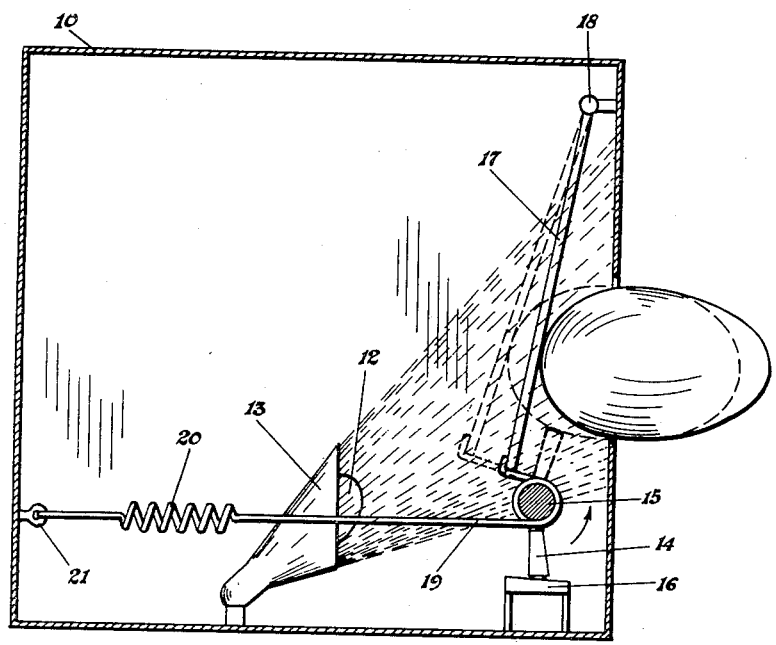
Figure 3:
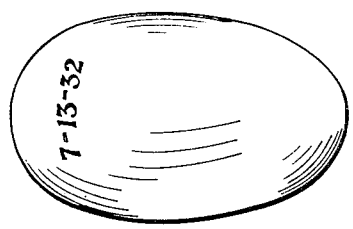
Figure 3 is a view of an egg which has been dated.
Figure 2:
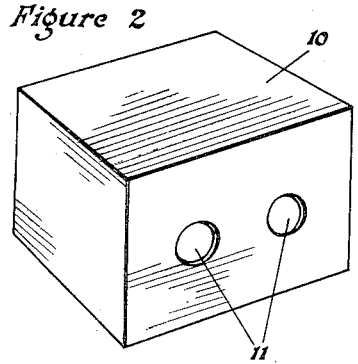
Figure 2 is a view in perspective of the candler and dater.

The device includes a boxlike structure 10 having one or more circular openings 11 of the required diameter. This diameter should be sufficiently large to permit the egg to actuate the mechanism within the device but the opening should not ordinarily be large enough to permit the egg to pass clear through. Any number of openings may be provided as desired but the customary arrangement contemplates the use of two openings 11 so that both hands may be used simultaneously in the candling of the eggs. The box 10 is further provided with a source of light 12 and a suitable reflector 13 for throwing a beam or cone of light in the direction of the egg.

As thus far described the device is a candler but additional mechanism is provided for dating the eggs. The dater 14 is secured to a shaft 15 which is journalled in the sides of the box 10. The dater 14 is secured in radial position to the shaft 15 so that he turning of the shaft will cause the turning of the dater from one position to the other. In the idle position of the dater it rests against the surface of the ink pad 16 but it is capable of being swung around to the dotted line position as shown in Figure 1 where it is in contact with the egg.

The mechanism for swinging the dater 14 from inoperative to operative position includes a shield 17 which is hinged at 18 to the inner wall of the box 10. A cord 19 or the like is secured at the lower edge of the shield 17 and it passes around the shaft 15, preferably being given one or more turns on that shaft. The cord 19 is associated with a spring 20 and it is secured at 21 to the rear wall of the box.

In operation, the egg is inserted in an aperture 11 into the full line position shown in Figure 1. The beam of light from the light source 12 will instantly reveal whether or not the egg is clear. The position of the egg at this stage is readily determined when it encounters the resistance of the shield 17. If the egg is found to be not clear, it is immediately withdrawn and placed in the discard receptacle. If, however, the egg is clear, it is pushed against the shield 17 which applies tension to the cord 19 and thus rocks the shaft 15 with the dater 14. The dater then comes in contact with the egg shell and stamps on the egg the date of candling and any other desired data. On the withdrawal of the egg, the egg with the date stamped thereon is placed in the egg case or other receptacle. The withdrawal of the egg releases the tension of the spring 20 so that the shield 17 will quickly resume its normal position and the dater 14 will move from its dotted line position to its full line position against the ink pad 16.

The details of the dater 14 are not shown since the structure of these details varies between wide limits and since the numerous forms of structures are well-known. The dater like all daters contemplates the use of interchangeable indicia, either with or without permanent indicia. It enables the poultryman or the egg dealer to candle his eggs quickly and expeditiously and to stamp on them the date of candling without any extra effort on his part. The device moreover is designed so that it may be used either as a candler alone or as a dater alone. As a candler alone it is as effective as any of the candlers now on the market. It sometimes happens that especially among poultrymen, it is desired to stamp the egg with the date on which the egg was laid. In such cases the eggs are gathered daily and they are passed through my device without paying any attention to the light which passes through them. By inserting them one after another through the apertures 11, the eggs are stamped with the dates on which they are laid.

Certain parts may be varied within limits of a wide range. The shield 17 in particular may be made in any of various ways, the object of the shield being merely to actuate the shaft 15. The shield may be made of a transparent material like glass so as to get the full benefit of the beam of light or it may be made with suitable apertures for admitting light therethrough.

Having thus described my invention in such full, clear, and exact terms that its construction and operation will be readily understood by others skilled in the art to which it pertains, what I claim as new and desire to secure by Letters Patent of the United States is:

1. An egg dater including a wall provided with an aperture for the partial admission of an egg, a shield hingedly suspended in the rear of said wall and in the path of the egg, a rock shaft having a dater thereon, a flexible member secured at one of its extremities to said shield and surrounding said shaft and having a fixed anchor at the other of its extremities, and an expansible tension member in said flexible member, the arrangement being such that the movement of said shield resulting from the pressure of the egg thereagainst will cause said shaft to rock to move said dater from idle position to egg contacting position.

2. A combined egg candler and dater including a box having an aperture in one of the walls thereof for the partial insertion of an egg, a yieldable shield within the box and within the path of the egg to function as a yieldable stop when the egg is in egg candling position, a dater and an ink pad therefor, a shaft, said dater being directly secured to the said shaft to project radially therefrom, and an elastic tension member secured at one of its extremities to said shaft to be wound thereon and secured at the other of its extremities to a wall of said box, said dater and pad and the actuating mechanism therefor being entirely enclosed within said box.

BERNARD KNOPP.